United States Patent [19]

Butler

[11] 4,139,039
[45] Feb. 13, 1979

[54] DEVICE FOR POSITIONING ANTI-SKID CHAINS

[76] Inventor: Patrick J. Butler, 104 W. Orange Ave., South San Francisco, Calif. 94080

[21] Appl. No.: 630,731

[22] Filed: Nov. 10, 1975

[51] Int. Cl.² ............................................. B60C 27/06
[52] U.S. Cl. .................................. 152/233; 152/213 R
[58] Field of Search ....... 152/213 R, 213 A, 231–232, 152/241–244, 222–230; 81/15.8; 24/84 R, 84 B, 84 H, 73 HH, 3 L, 3 J

[56] References Cited

U.S. PATENT DOCUMENTS

| 711,659 | 10/1902 | Graham et al. | 24/84 B |
|---|---|---|---|
| 1,780,169 | 11/1930 | Chadbourne | 152/242 |
| 2,184,434 | 12/1939 | Ryan et al. | 24/84 H |
| 3,213,926 | 10/1965 | Seckerson | 24/84 B |
| 3,303,729 | 2/1967 | Webb et al. | 152/213 R |

Primary Examiner—Albert J. Makay
Assistant Examiner—Donald W. Underwood
Attorney, Agent, or Firm—George B. White

[57] ABSTRACT

A clip made of a single flat spring strip with a hook portion at one end insertable between the rim and the exposed wall of the tire adjacent the rim, and a cylindrical loop formed from its other end opposite to said hook so that free edge of the loop is substantially at the same level as the top of the hook and is spaced therefrom to a distance narrower than the thickness of a link or hook at the end of a snow chain thereby to prevent accidental disengagement of the chain link.

2 Claims, 3 Drawing Figures

DEVICE FOR POSITIONING ANTI-SKID CHAINS

BACKGROUND OF THE INVENTION

The Applicant is aware of the prior art attempts to solve the problem somewhat similarly, such as the closest prior U.S. Pat. No. 2,731,059 granted to E. R. Ford in 1956. Other patents of which applicant is aware are U.S. Pat. No. 2,583,879 granted to Herbert H. Pohl; U.S. Pat. No. 2,609,027 granted to Locke; U.S. Pat. No. 2,672,911 granted to Bushnell; U.S. Pat. No. 2,777,499 granted to Erving, and U.S. Pat. No. 3,042,095 granted to Knowles.

The advantageous features of the Applicant's invention are that the clip for the snow chain is a single piece and is made of springy yet firm material so that its hook can be easily sprung over the edge of the tire rim, and a link can be sprung quickly into the loop and securely held therein during the turning of the wheel to roll the snow chain over a tire.

DETAILED DESCRIPTION

Figure 1:
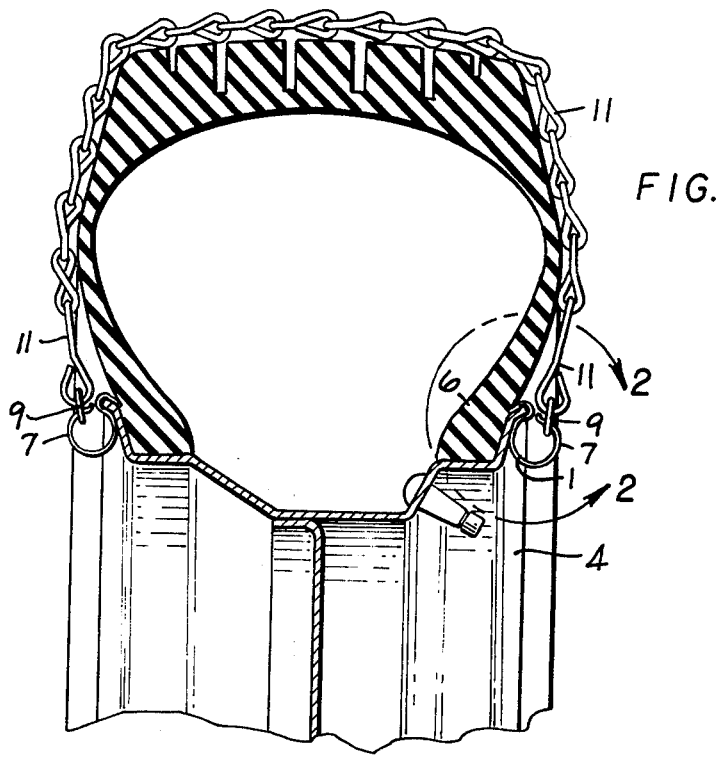
FIG. 1 is a fragmental cross-sectional view of a tire on a rim with a snow chain around the tire hooked to the clips.
Figure 2:
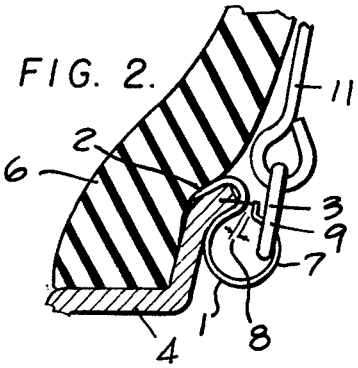
FIG. 2 is a fragmental sectional view on a larger scale showing one of the clips in operation.
Figure 3:
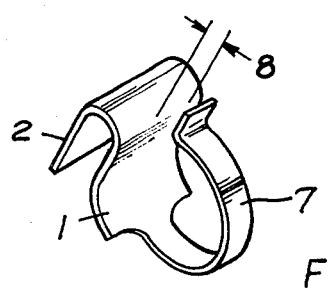
FIG. 3 is a perspective view of the clip.

The invention is a unitary clip consisting of a flat strip of spring steel. A stem 1 has a hook 2 formed on one end thereof adapted to be placed over the edge 3 of the rim 4 between the said edge and the adjacent side of the tire 6.

The other end of the flat straight stem 1 is bent away from said hook 2 and is formed into a cylindrical loop oppositely to the hook 2, the width of the strip at the outer portion of the loop 4 is reduced to form shoulders 10. The loop 4 is of almost completely circular cross section so that the clearance 8 between the end of the loop 4 and the top of the straight stem 1 at the periphery of the hook 2 is narrower than the thickness of the chain hook or link on the adjacent end of the snow chain 11. On the free end of the loop 4 is a lip 12 bent away from the stem 1 to facilitate the forcing of a link 9 through the clearance 8.

In operation the hook 2 is pressed over the edge of the rim adjacent the tire to be held in place, one on each side of the tire and the chain hooks or link 9 on the opposite sides at the end of the chain 11 are sprung into the loop 7 and then the car is driven so that as the wheel is turned the chain is pulled over the tire until the entire chain 11 is in position.

The advantage of this structure is that each clip is a one piece simple unit which can be carried easily in a small bag or next to the chain and also that it is easy to use and store. Although simple, it is capable of securely holding the chain hooks and links for performing the mounting of the anti-friction chain over the tire and it is light therefore and can be kept on the tire rim without appreciably altering the tire balance.

I claim:

1. A clip in combination with the end of a snow chain on a tire and a tire rim, comprising
   a flat strip of springy material
   one end of the strip being bent upon itself and being substantially parallel with the strip and spaced therefrom forming a hook, said bent end being inserted between the edge of the rim and the tire therein;
   the other end of the strip being bent upon itself into an almost cylindrical loop and being open oppositely to said hook,
   the clearance between the open end of said loop and the strip being narrower than the thickness of the end of said snow chain, and
   a lip on the open end of said loop flaring away from said strip and forming a tapered inlet at said clearance for insertion of said end of said snow chain.

2. The invention specified in claim 1, and
   the strip around the outer portion of said loop being narrower than the width of said hook.

* * * * *